United States Patent [19]

Nishii et al.

[11] Patent Number: 4,986,613
[45] Date of Patent: Jan. 22, 1991

[54] HYDRAULIC BRAKING SYSTEM FOR AN AUTOMOTIVE VEHICLE

[75] Inventors: Michiharu Nishii, Toyota; Genji Mizuno, Toyoake; Yoshihisa Nomura, Toyota; Masahiko Kato, Nagoya; Kenji Shirai, Mishima; Junichi Tanoue, Susono, all of Japan

[73] Assignees: Aisin Seiki Kabushiki Kaisha, Kariya; Toyota Jidosha Kabushiki Kaisha, Toyota, both of Japan

[21] Appl. No.: 386,274

[22] Filed: Jul. 28, 1989

[30] Foreign Application Priority Data

Jul. 30, 1988 [JP] Japan .................. 63-191474

[51] Int. Cl.$^5$ ............................. B60T 13/14
[52] U.S. Cl. .................. 303/114; 60/547.1; 188/358; 303/13; 303/52; 303/113; 303/119; 303/6.01
[58] Field of Search ............. 303/50–56, 303/13–14, 113–119, 6.01, 9.62, 100, 92; 60/547.1, 565, 566, 555, 556, 557, 582; 188/358, 359

[56] References Cited

U.S. PATENT DOCUMENTS

| | | |
|---|---|---|
| 3,883,189 | 5/1975 | Braun . |
| 3,910,645 | 10/1975 | Takeuchi et al. .......... 303/114 |
| 4,720,151 | 1/1988 | Belart et al. ............. 303/114 X |
| 4,730,877 | 3/1988 | Seibert et al. ........... 303/114 X |
| 4,755,008 | 7/1988 | Imoto et al. ............. 303/114 X |
| 4,874,207 | 10/1989 | Nishii et al. . |

FOREIGN PATENT DOCUMENTS

| | | |
|---|---|---|
| 3428870 | 2/1986 | Fed. Rep. of Germany . |
| 58-44038 | 5/1983 | Japan . |
| 59-227552 | 12/1984 | Japan . |
| 62-149547 | 7/1987 | Japan . |
| 2083581 | 9/1980 | United Kingdom . |
| 2140519 | 11/1984 | United Kingdom . |
| 2179715 | 3/1987 | United Kingdom . |

Primary Examiner—Douglas C. Butler
Attorney, Agent, or Firm—Burns, Doane, Swecker & Mathis

[57] ABSTRACT

A hydraulic braking system for an automotive vehicle having a power source for generating a hydraulic power pressure, a reservoir, a master cylinder, a hydraulic booster for actuating the master cylinder in response to depression of a brake pedal and a plurality of wheel brake cylinders for braking respective road wheels, which are divided into a first group of wheel brake cylinders communicating with the master cylinder and a second group of wheel brake cylinders communicating with the hydraulic booster. An auxiliary cylinder is disposed between the master cylinder and the first group of wheel brake cylinders to which a hydraulic braking pressure from the master cylinder is directly applied in its inoperative condition, and it increases the hydraulic braking pressure in response to depression of the brake pedal in its operative condition which is made when the hydraulic power pressure, for example, is less than the hydraulic braking pressure by a predetermined difference. Control structure is connected to the auxiliary cylinder and allows the auxiliary cylinder in its operative condition when the hydraulic braking pressure, for example, is less than a predetermined value.

13 Claims, 4 Drawing Sheets

HYDRAULIC BRAKING SYSTEM FOR AN AUTOMOTIVE VEHICLE

BACKGROUND OF THE INVENTION

1. Field of the Invention

The present invention relates to a hydraulic braking system for use in an automotive vehicle, and more particularly to a hydraulic braking system which comprises a hydraulic booster for actuating a master cylinder in response to operation of a manually-operated member with a hydraulic power pressure supplied from a power source, and an auxiliary cylinder which is disposed between wheel brake cylinders and the master cylinder and which increases the hydraulic braking pressure supplied from the master cylinder to the wheel brake cylinders.

2. Description of the Prior Art

In conventional service braking systems for an automotive vehicle, there are provided a plurality of hydraulic circuits connecting wheel brake cylinders mounted on road wheels with a hydraulic braking pressure generator such as a master cylinder, so that when one of the hydraulic circuits is broken, braking operation is performed by the rest of the hydraulic circuits. In general, a tandem master cylinder is used in a conventional dual circuits system.

In order to reduce the force required to operate a manually-operated member, for example a depressing force applied on a brake pedal in braking operation, the hydraulic braking system is provided with a servo unit which is referred as a servo or a booster and which utilizes compressed air, intake manifold vacuum (for a vacuum booster), or hydraulic pressure (for a hydraulic booster) as a power source. The hydraulic booster is a booster which actuates the hydraulic braking pressure generator such as the master cylinder by the hydraulic power pressure supplied from the power source in response to depression of the brake pedal.

It has been proposed to employ the hydraulic booster, in the hydraulic braking system, as a dynamic hydraulic braking pressure generator in addition to the master cylinder. In other words, a hydraulic pressure generated by the hydraulic booster in response to depression of the brake pedal is applied directly to one of the hydraulic circuits. For example, as shown in Japanese Patent Laid-open Publication No. 59-227552, the hydraulic pressure generated by the hydraulic booster is applied to rear wheel brake cylinders in a front-rear dual circuits system in order to reduce the stroke of the brake pedal.

As for the above-described conventional hydraulic braking system, in the case where the hydraulic booster becomes insufficient to fulfill its boost function, or the case where the hydraulic power pressure disappears due to stoppage of the power source or other defects so that the hydraulic booster becomes incapable of obtaining any boost function, the braking force on the front road wheels is ensured by the master cylinder, but a large depressing force shall be applied on the brake pedal in order to obtain the necessary braking force. In the, Japanese Patent Laid-open Publication No. 62-149547, there is disclosed a system, in which a booster or an auxiliary cylinder is arranged in parallel with a hydraulic braking pressure generator and a control valve is provided for applying to wheel brake cylinders a hydraulic braking pressure from a master cylinder increased by the auxiliary cylinder when a hydraulic pressure generated in a hydraulic pressure chamber of a hydraulic booster or a power source is less than that in the master cylinder by a predetermined value or above, while applying the hydraulic braking pressure from the master cylinder to the wheel brake cylinders without increasing the hydraulic braking pressure in the case other than the above. Thereby, even if the boost function of the hydraulic booster cannot be obtained, the hydraulic braking pressure from the master cylinder is increased by the auxiliary cylinder to be applied to the wheel brake cylinders, so that a large depressing force is not necessary to be applied on the brake pedal. Further, in the above publication, various embodiments are disclosed for the auxiliary cylinder.

However, in the above described hydraulic braking system provided with the auxiliary cylinder, since the hydraulic braking pressure is increased in response to a pressure difference between the hydraulic pressure generated by the power source or the hydraulic booster and the hydraulic braking pressure from the master cylinder, even in the case where the hydraulic pressure generated by the power source or the hydraulic booster is sufficient, the hydraulic braking pressure from the master cylinder is increased when the brake pedal is further depressed, so that an excessive braking force is applied thereon. Namely, when the hydraulic pressure generated by the power source or the hydraulic booster exceeds the hydraulic braking pressure from the master cylinder, the auxiliary cylinder is inoperative. However, when a large depressing force is further applied on the brake pedal so that the hydraulic braking pressure, which exceeds the hydraulic pressure generated by the power source or the hydraulic booster is supplied from the master cylinder, and the pressure difference therebetween comes to be more than a predetermined value, then the auxiliary cylinder increases the hydraulic braking pressure. Thus, even in the case where a large braking force is not necessary, as in the case where a vehicle is stopped for example, an excessive braking force is applied to the wheel brake cylinders.

SUMMARY OF THE INVENTION

Accordingly, it is an object of the present invention to provide a hydraulic braking system for an automotive vehicle having an auxiliary cylinder which increases a hydraulic braking pressure from a master cylinder without causing any excessive braking force applied to wheel brake cylinders.

It is another object of the present invention to provide a hydraulic braking system for an automotive vehicle having an auxiliary cylinder which increases a hydraulic braking pressure from a master cylinder when a hydraulic pressure generated by a power source or a hydraulic booster is insufficient, and which does not increase the hydraulic braking pressure when the hydraulic pressure generated by the power source or the hydraulic booster is sufficient.

In accomplishing these and other objects, a hydraulic braking system for an automotive vehicle according to the present invention comprises a power source for generating a hydraulic power pressure, a reservoir for storing an amount of brake fluid, a master cylinder for introducing the brake fluid thereinto from the reservoir and generating a hydraulic braking pressure in response to operation of a manually-operated member, a hydraulic booster for actuating the master cylinder by the hydraulic power pressure supplied from the power source in response to operation of the manually-operated member, a plurality of wheel brake cylinders for braking respective road wheels, which is divided into a first group of wheel brake cylinders communicating with the master cylinder through a first hydraulic circuit and a second group of wheel brake cylinders communicating with the hydraulic booster through a second hydraulic circuit. The hydraulic braking system further comprises an auxiliary cylinder which is disposed in the first hydraulic circuit and which applies the hydraulic braking pressure from the master cylinder directly to the first group of wheel brake cylinders in an inoperative condition of the auxiliary cylinder and increases the hydraulic braking pressure applied to the first group of wheel brake cylinders in response to operation of the manually-operated member in an operative condition of the auxiliary cylinder. The operative condition is made when one of the hydraulic power pressure generated by the power source and a hydraulic pressure generated by the hydraulic booster is less than the hydraulic braking pressure by a predetermined difference. Further, control means is connected to the auxiliary cylinder for allowing the auxiliary cylinder in its operative condition only when one of hydraulic pressures generated by the power source, the hydraulic booster and the master cylinder is less than a predetermined value.

In the above-described hydraulic braking system, the auxiliary cylinder preferably comprises a cylinder body having a cylinder bore defined therein and a piston which is axially slidably disposed within the cylinder bore. The piston forms at its one end within the cylinder bore a first chamber communicating with the master cylinder, and forms at its other end within the cylinder bore a second chamber communicating with the first group of wheel brake cylinders and a third chamber communicating with one of the power source and the hydraulic booster. The piston has a valve mechanism disposed therein for normally allowing the communication between the first chamber and the second chamber, and blocking the communication therebetween when a hydraulic pressure in the third chamber of the auxiliary cylinder is less than a hydraulic pressure in the first chamber by the predetermined difference.

In the above-described braking system, the control means may comprise a control valve which is disposed in a third hydraulic circuit communicating the third chamber with one of the power source and the hydraulic booster, and which permits the fluid communication through the third hydraulic circuit when one of hydraulic pressures supplied therethrough from the power source and the hydraulic booster is less than the predetermined value, and blocks the fluid communication through the third hydraulic circuit when one of the hydraulic pressures supplied therethrough exceeds the predetermined value.

In the above-described braking system, the control means may comprise a bypass circuit which communicates the master cylinder with the first group of wheel brake cylinders in parallel with the first hydraulic circuit, and a bypass valve which is disposed in the bypass circuit and which normally blocks the fluid communication through the bypass circuit and permits the fluid communication through the bypass circuit when one of hydraulic pressures supplied from the power source, the hydraulic booster and the master cylinder exceeds the predetermined value.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
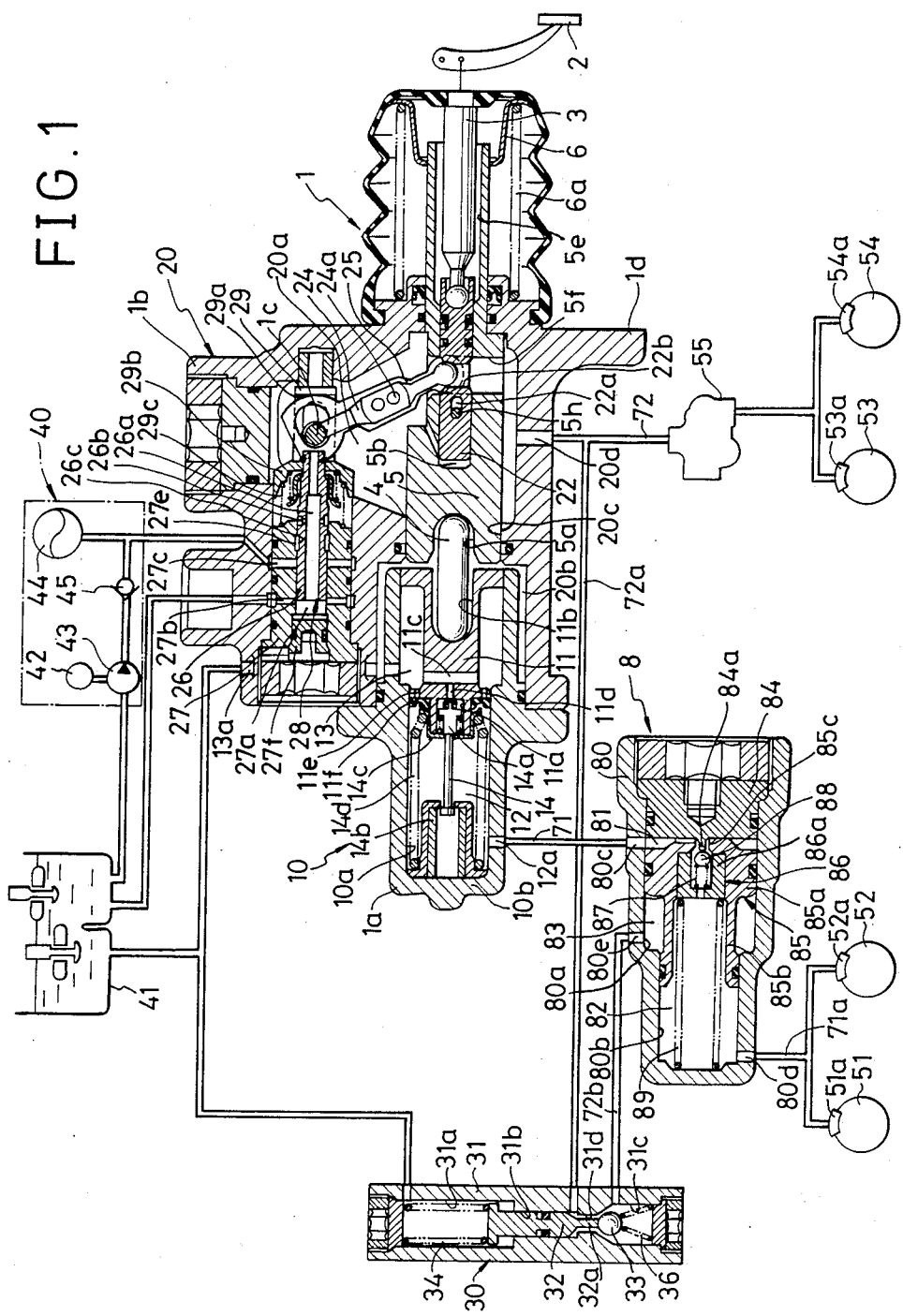
FIG. 1 is a schematic illustration of a hydraulic braking system of a first embodiment of the present invention with a sectional view of a hydraulic pressure generator, an auxiliary cylinder and a control valve.

Referring to FIG. 1, there is illustrated a hydraulic braking system of an embodiment of the present invention, which includes a hydraulic pressure generator (hereinafter referred to simply as a pressure generator) 1 having a master cylinder 10 and a hydraulic booster 20. A power source 40 and a reservoir 41 are connected to the presure generator 1. A depressing force applied on a brake pedal 2 which is provided as a manually-operated member is transmitted as a braking force to the pressure generator 1. In response to this braking force, a hydraulic pressure is generated by the pressure generator 1 and applied to wheel brake cylinders 51a to 54a mounted on front road wheels 51, 52 and rear road wheels 53, 54, through hydraulic circuits 71, 72 provided as a first hydraulic circuit and a second hydraulic circuit respectively.

As for the master cylinder 10, a master piston 11 is fluid-tightly and slidably disposed in a cylinder bore 10a defined in a housing 1a. The master piston 11 has a small-diameter land portion and a large-diameter land portion, and the cylinder bore 10a is formed as a stepped bore having corresponding small-diameter and large-diameter portions. In the large-diameter portion of the cylinder bore 10a, a fluid chamber 13 is defined between the small-diameter land portion and the large-diameter land portion of the master piston 11, and in the small-diameter portion of the cylinder bore 10a, a pressure chamber 12 is defined between the small-diameter land portion of the master piston 11 and a closed end portion 10b. The pressure chamber 12 communicates with the passage 71 via a port 12a, and the fluid chamber 13 communicates with the reservoir 41 via a port 13a.

The master piston 11 has a pair of holes 11a, 11b extending axially from its opposite ends toward its center, and a hole 11c formed radially. The hole 11a communicates with the hole 11c via a small hole 11d formed axially. Also, a hole 11e is formed axially in a peripheral portion of the master piston 11, and covered by a cup seal 11f at its end open to the pressure chamber 12, whereby a check valve is formed. A valve member 14a mounted on one end of the valve rod 14 is slidably received in the hole 11a of the master piston 11 in opposing relation to the small hole 11d, and the valve member 14a is restricted from moving toward the closed end portion 10b by a retainer 14c. A large-diameter portion of the other end of the valve rod 14 is slidably disposed in a retainer 14b, and restricted from moving toward the master piston 11. An output rod 4 is disposed in the hole 11b of the master piston 11. A return spring 14d is mounted between the retainers 14b and 14c so as to normally bias the master piston 11 away from the closed end portion 10b. Therefore, the opposite ends of the valve rod 14 are normally in engagement with the respective retainers 14b, 14c.

Thus, the valve member 14a and the small hole 11d are spaced from each other, brake fluid supplied from the reservoir 41 to the fluid chamber 13 via the port 13a is filled in the pressure chamber 12 via the hole 11e of the master piston 11, and the hole 11c, the small hole 11d and the hole 11a. When the master piston 11 is moved toward the closed end portion 10b against the biasing force of the return spring 14d, the hole 11e is closed by the cup seal 11f and the small hole 11d is closed by the valve member 14a so that the pressure chamber 12 is held in the closed state except the port 12a. Accordingly, the pressure of the brake fluid is increased in response to movement of the master piston 11.

In a housing 1b joined with the housing 1a, a boost chamber 20a and a low-pressure chamber 20b of the hydraulic booster 20 are defined, and a power piston 5 is fluid-tightly and slidably disposed in a bore 20c which is formed between the boost chamber 20a and the low-pressure chamber 20b, and which is substantially coaxial with the cylinder bore 10a. The power piston 5 is provided with a retainer 6 at its end extending toward the brake pedal 2, and a spring 6a is mounted between the retainer 6 and the housing 1b so as to normally bias the power piston 5 toward the brake pedal 2. The power piston 5 has at its middle portion a shoulder portion which abuts on the housing 1b to restrict the power piston 5 from sliding toward the brake pedal 2. In the power piston 5, there are formed a recess 5a at the end facing the master piston 11, a bore 5b and a bore 5e which is larger in diameter than the bore 5b. A communication hole is formed in the bottom of the bore 5b, and a reaction piston 22 is slidably received in the bore 5b.

In the reaction piston 22, there is formed an elongated hole 22a extending coaxially with the axis of the reaction piston 22, and a through-hole 22b extending perpendicularly to the elongated hole 22a. A pin 5h fixed to the power piston 5 is disposed in the elongated hole 22a, so that the reaction piston 22 is restricted from sliding at least toward the brake pedal 2 with respect to the power piston 5. One end of an input rod 3 is connected to the brake pedal 2, and the other end of the input rod 3 is provided with a spherical head which is inserted in the bore 5e of the power piston 5 and received in the recess of the reaction piston 22, and which is engaged with the projection formed on the inner surface of the recess. In the power piston, there is formed radially a through-hole 5f which is aligned with the through-hole 22b when the reaction piston 22 is positioned most closely to the brake pedal 2 and which is larger in diameter than the through-hole 22b. The output rod 4 is received in the recess 5a of the power piston 5. The output rod 4 is insented into the hole 11b so that its head portion abuts on the bottom of the hole 11b.

A support lever 24 is pivotally connected at its one end to the housing 1b by a pin 1c for pivotal movement within the boost chamber 20a, and a spherical head of the support lever 24 is fitted into the through-hole 22b of the reaction piston 22. And, one head of a control lever 25, which is pivotally connected with the support lever 24 by a pin 24a, is fitted into the through-hole 5f of the power piston 5. In the other head of the control lever 25, there is defined a hole around the pin 1c. Accordingly, when the reaction piston 22 slides toward the output rod 4 with respect to the power piston 5 which is urged toward the brake pedal 2, a rotating force is exerted on the support lever 24 so as to pivotally move the support lever 24 clockwise about the pin 1c. At that time, since one head of the control lever 25 is retained in the through-hole 5f of the power piston 5, the other head of the control lever 25 is rotated counterclockwise about the pin 24a and hence moved in the sliding direction of the reaction piston 22. As a result, the other head of the control lever 25 is displaced in response to movement of the reaction piston 22 until it comes into contact with the bottom of the bore 5b.

The housing 1b has a spool-valve bore extending substantially in parallel with the power piston 5 and communicating with the boost chamber 20a, and a spool valve 28 is fitted into the spool-valve bore. The spool valve 28 has a spool 26 which is slidably received in a spool bore 27a formed in a cylinder 27 substantially in parallel with the power piston 5. One end of the spool bore 27a is fluidtightly plugged by a closure member 27f. In the spool 26, there is formed axially a hole 26a, and formed radially a hole 26b communicating with the hole 26a. One end of the spool 26 is positioned in the boost chamber 20a and connected to one end of a control rod 29. The other end of the control rod 29 is slidably mounted on a recess formed in the housing 1b, and the head of the control lever 25 is fitted into a through-hole 29a radially bored in the control rod 29. Between the cylinder 27 and a retainer 29b supported at one end of the control rod 29, a spring 29c is mounted so as to normally bias the spool 26 toward the pin 1c. The hole 26a normally opens to the boost chamber 20a at the junction of the spool 26 and the control rod 29. When the control lever 25 is in its initial position, the hole 26a of the spool 26 communicates with the reservoir 41 through a hole 27b radially bored in the cylinder 27. Thus, the boost chamber 20a also communicates with the reservoir 41 and is filled with the brake fluid under the atmospheric pressure.

A hole 27c communicating with the power source 40 is formed in the cylinder 27 with a predetermined distance from the hole 27b toward the control rod 29. The hole 27c is normally closed by the peripheral surface of the spool 26. Between the hole 27c and the one end of the spool 26 facing the control rod 29, an annular groove 27e is formed on the inner surface of the cylinder 27, and an annular groove 26c is formed on the peripheral outer surface of the spool 26 in opposing relation to the annular groove 27e. When the spool 26 is moved toward the closure member 27f in response to movement of the control lever 25, the hole 27b of the cylinder 27 is closed. The hole 27c in turn faces the annular groove 26c of the spool 26, and the annular groove 27e faces the hole 26b. Consequently, the hole 27c communicates with the hole 26a.

Accordingly, the hydraulic power pressure of the power source 40 is introduced into the boost chamber 20a to increase the hydraulic pressure therein, so that the reaction force is thereby transmitted to the brake pedal 2 through the reaction piston 22, and simultaneouly the increased hydraulic pressure is applied to the power piston 5. The power piston 5 moves until the pin 5h comes into contact with an end portion of the elongated hole 22a at maximum with respect to the reaction piston 22. Thereby, the relative position of the control lever 25 and the support lever 24 becomes that in its initial state. Accordingly, the control lever 25 is moved clockwise to retract the control rod 29 toward the brake pedal 2. Thereby, the hole 27c of the cylinder 27 is closed, and in turn the hole 27b communicates with the hole 26a of the spool 26 to lower the hydraulic pressure in the boost chamber 20a, so that the power piston 5 is moved toward the brake pedal 2. With this operation performed repeatedly, the hydraulic power pressure within the boost chamber 20a is regulated so as to boost the master cylinder 10.

The boost chamber 20a of the hydraulic booster 20 communicates with one circuit of the dual circuits, that is, it communicates with the wheel brake cylinders 53a, 54a of the rear road wheels 53, 54 through the hydraulic circuit 72 in the present embodiment, while the pressure chamber 12 of the master cylinder 10 communicates with the other circuit, that is, it communicates with the wheel brake cylinders 51a, 52a of the front road wheels 51, 52 through the hydraulic circuit 71 via an auxiliary cylinder 8. Further, a proportioning valve 55 is disposed in the hydraulic circuit 72.

The auxiliary cylinder 8 having a cylinder body 80 and a piston 85 received therein is disposed between the pressure generator 1 and the wheel brake cylinders 51a and 52a. The auxiliary cylinder 8 may be mounted on a flange portion 1d of the housing 1b to be incorporated into the pressure generator 1. In the cylinder body 80, there is formed a stepped cylinder bore of a large-diameter bore 80a and a small-diameter bore 80b. The piston 85 has a cylindrical skirt portion 85b, which is fluid-tightly and slidably fitted into the small-diameter bore 80b, and a stepped head portion 85a, which is fluid-tightly and slidably fitted into the large-diameter bore 80a. The large-diameter bore 80a of the cylinder body 80 is plugged by a closure member 84, so that a first pressure chamber 81 is formed therein between the closure member 84 and the head portion 85a of the piston 85. A port 80c communicating with the first pressure chamber 81 is connected to the hydraulic circuit 71 communicating with the port 12a of the master cylinder 10. Accordingly, the hydraulic braking pressure in the pressure chamber 12 is applied to the first pressure chamber 81. On the other hand, a second pressure chamber 82 is formed in the small-diameter bore 80b between the closed end of the cylinder body 80 and the skirt portion 85b of the piston 85. A port 80d is connected to a hydraulic circuit 71a communicating with the wheel brake cylinders 51a, 52a mounted on the front road wheels 51, 52. Further, a third pressure chamber 83 is formed in the large-diameter bore 80a between the head portion 85a and the skirt portion 85b of the piston 85. A port 20d of the hydraulic booster 20 communicates with a port 80e through hydraulic circuits 72a, 72b, or forked circuits of the hydraulic circuit 72, and a control valve 30 disposed therebetween which will be described later. Consequently, the hydraulic pressure generated by the hydraulic booster 20 is applied to the third pressure chamber 83.

In the head portion 85a of the piston 85, there are formed a recess opening to an inner cylinder of the skirt portion 85b and a communication hole 85c for communicating the recess with the first pressure chamber 81, and a valve mechanism 86 is fittingly inserted into the recess. The valve mechanism 86 includes a cylindrical case 86a having a small hole bored in the bottom thereof, a spherical valve member 88 and a spring 87 which are received in the cylindrical case 86a. The valve member 88 is biased by the spring 87 so as to be seated on a seat formed around the communication hole 85c. On the closure member 84, there is formed an projection 84a which faces the communication hole 85c and which is smaller in diameter and larger in length than the communication hole 85c. The projection 84a may extend through the communication hole 85c for abutting contact with the valve member 88 to open the communication hole 85c. A spring 89 is provided between the head portion 85a of the piston 85 and the bottom of the cylinder body 80 for biasing the head portion 85a toward the closure member 84.

Accordingly, in the normal case where the sum of the hydraulic pressure in the second and third pressure chambers 82, 83 and a predetermined biasing force of the spring 89 exceeds the hydraulic pressure in the first pressure chamber 81, the first pressure chamber 81 communicates with the second pressure chamber 82 through the communication hole 85c. In the case where the hydraulic pressure from the hydraulic booster 20 is reduced and the hydraulic pressure in the third pressure chamber 83 becomes less than the hydraulic pressure in the first pressure chamber 81, that is, the hydraulic braking pressure from the master cylinder 10, by a predetermined difference or above, the piston 85 is moved toward the bottom of the cylinder body 80, so that the communication hole 85c is closed by the valve member 88.

The control valve 30 which constitutes the control means according to the present invention is formed of a normally open valve which is disposed between the hydraulic circuits 72a and 72b provided as a third hydraulic circuit, and which includes a piston 32 slidably received in a stepped cylinder bore formed in a cylinder 31 or a housing and a spherical valve member 33, whereby the communication between the hydraulic circuits 72a and 72b is permitted or blocked according to the value of the hydraulic pressure supplied to the control valve 30 from the hydraulic booster 20. In the present embodiment, the control valve 30 is provided separately from the auxiliary cylinder 8, while the control valve 30 may be formed integrally with the auxiliary cylinder 8. In the cylinder 31, there is formed a stepped bore of a large-diameter bore 31a and a small-diameter bore 31b, and a bore 31c is formed as well. The bore 31c communicates with the small-diameter bore 31b through a communication hole 31d. Open ends of the large-diameter bore 31a and the bore 31c are plugged by closure members to form a control chamber and a valve chamber respectively.

A cylindrical control piston 32 (hereinafter simply referred to as a piston 32) is fluid-tightly and slidably fitted into the small-diameter bore 31b. On one end of the piston 32, there is formed a projection 32a which is smaller in diameter and larger in length than the communication hole 31d, and which advances and retreats within the communication hole 31d in response to the sliding motion of the piston 32. The piston 32 is biased toward the communication hole 31d by a spring 34 received in the large-diameter bore 31a. A valve member 33 is received in the bore 31c and biased toward the communication hole 31d by a spring 36 for abutting contact with the projection 32a of the piston 32 to keep the balance under the condition as shown in FIG. 1. Namely, the communication hole 31d normally allows the communication between the small-diameter bore 31b and the bore 31c. The bore 31c communicates with the third pressure chamber 83 of the auxiliary cylinder 8 through the hydraulic circuit 72b. A first control chamber defined in the large-diameter bore 31a communicates with the reservoir 41, and a second control chamber defined in the small-diameter bore 31b between the piston 32 and the cylinder 31 communicates with the hydraulic booster 20 through the hydraulic circuit 72a.

Accordingly, when the hydraulic pressure generated by the hydraulic booster 20 is supplied to the small-diameter bore 31b through the hydraulic circuit 72a under the condition as shown in FIG. 1, the communication hole 31d is held to be in its communicating state if the hydraulic pressure as noted above is lower than a predetermined value, and then this hydraulic pressure is supplied to the auxiliary cylinder 8 through the communication hole 31d. When the hydraulic pressure generated by the hydraulic booster 20 exceeds the predetermined value, the piston 32 slides against the spring 34 in the direction away from the communication hole 31d, and the communication hole 31d is closed by the valve member 33, so that the hydraulic circuits 72a, 72b for communicating the hydraulic booster 20 with the auxiliary cylinder 8 are shut off. Namely, the control valve 30 functions as pressure control means for shutting off the hydraulic pressure which exceeds a predetermined value.

The power source 40 comprises a fluid pump 43 driven by an electric motor 42 and is so structured that its input side is connected to the reservoir 41 while its output side is connected to an accumulator 44 via a check valve 45, and the hydraulic power pressure is supplied to necessary portions via the accumulator 44. Further, the electric motor 42 is intermittently controlled in response to a signal of a pressure sensor (not shown), so that the hydraulic power pressure is maintained to be at a predetermined value.

The operation of the above described embodiment will now be explained. When the brake pedal 2 is not depressed as shown in FIG. 1, the pressure chamber 12 of the master cylinder 10 communicates with the fluid chamber 13, the former communicating with the first pressure chamber 81 of the auxiliary cylinder 8 and the latter communicating with the reservoir 41 respectively, so that the brake fluid filled in these chambers is under a pressure equal to the pressure in the reservoir 41, that is, substantially under the atmospheric pressure. When the power source 40 is operated, the hydraulic power pressure is applied to the hole 27c of the hydraulic booster 20. However, the hydraulic booster 20 is inoperative as long as the hole 27c is closed as shown in FIG. 1. In this condition, the boost chamber 20a of the hydraulic booster 20 communicates with the reservoir 41 via the communication hole 27b and is substantially under the atmospheric pressure, so that the wheel brake cylinders 53a, 54a which communicates with the boost chamber 20a through the port 20d and the hydraulic circuit 72, and third pressure chamber 83 of the auxiliary cylinder 8 which communicates with the boost chamber 20a through the hydraulic circuits 72a, 72b and the control valve 30 are also under the atmospheric pressure. Accordingly, the valve member 88 which is biased by the spring 89 comes to contact with the projection 84a, so that the first pressure chamber 81 communicates with the second pressure chamber 82 through the communication hole 85c.

When the brake pedal 2 is depressed, the reaction piston 22 is pushed by the input rod 3. And, when the reaction piston 22 is moved until it comes into contact with the power piston 5, the control lever 25 is rotated counterclockwise with respect to the support lever 24 so that the head of the control lever 25 pushes the spool 26. Thereby, the hydraulic power pressure is introduced from the power source 40 into the boost chamber 20a to push the power piston 5, so that the boost force is applied to the master piston 11, and the reaction force is transmitted to the brake pedal 2 via the reaction piston 22. The hydraulic pressure in the boost chamber 20a is directly applied to the wheel brake cylinders 53a, 54a from the port 20d simultaneously, while the hydraulic pressure is applied to the third pressure chamber 83 of the auxiliary cylinder 8 via the control valve 30 which is in its open position. Then, the master piston 11 starts to slide with the power piston 5 moved, the small hole 11d is closed by the valve member 14a. When the master piston 11 is moved further to reduce the volume of the pressure chamber 12, the hydraulic braking pressure is generated and applied to the wheel brake cylinders 51a, 52a through the auxiliary cylinder 8. Further, the boost chamber 20a is regulated to keep a predetermined boost pressure with the spool valve 28 operated by the control lever 25 in response to the relative displacement of the power piston 5 to the reaction piston 22.

In the case where the power source 40 is stopped for some reason and the hydraulic power pressure is not supplied therefrom, the hydraulic booster 20 becomes inoperative. Or, the hydraulic booster 20 may not function sufficiently due to its own defects. In these cases, the hydraulic pressures in the third pressure chamber 83 of the auxiliary cylinder 8 and the wheel brake cylinders 53a, 54a, which communicate with the boost chamber 20a, are decreased to the same value. When the master piston 11 is moved under this condition, the hydraulic braking pressure in the pressure chamber 12 is applied to the first pressure chamber 81 of the auxiliary cylinder 8. Since the hydraulic pressure in the third pressure chamber 83 is decreased, the piston 85 is moved toward the bottom of the cylinder body 80, so that the communication hole 85c is closed by the valve member 88. In consequence, the hydraulic braking pressure in the second pressure chamber 82 is increased until the piston 85 comes into contact with the bottom of the cylinder 80. Accordingly, even in the case where the hydraulic power pressure disappears, or in the case where the boost function of the hydraulic booster 20 is insufficient, the hydraulic braking pressure increased by the auxiliary cylinder 8 is applied to the wheel brake cylinders 51a, 52a. Namely, when the hydraulic pressure in the third pressure chamber 83 disappears or is decreased, the hydraulic braking pressure of the master cylinder 10 is applied to the head portion 85a of the piston 85. Therefore, a hydraulic pressure in the second pressure chamber 82 is increased substantially in inverse proportion to the ratio of the sectional area of the head portion 85a to the sectional area of the skirt portion 85b, though it may be slightly reduced due to the leakage of fluid or the biasing force of the spring 89 practically.

In the operation as noted above, since the hydraulic pressure from the hydraulic booster 20 is less than the predetermined value set at the control valve 30, the control valve 30 maintains the hydraulic circuits 72a, 72b to communicate with each other. When the hydraulic pressure from the hydraulic booster 20 exceeds the predetermined value, the communicating hole 31d is closed by the valve member 33 of the control valve 30 to shut off the hydraulic circuits 72a, 72b from each other. Therefore, the hydraulic pressure from the hydraulic booster 20 is not introduced into the third pressure chamber 83 of the auxiliary cylinder 8. Accordingly, even if the hydraulic braking pressure is generated by the master cylinder 10 in excess of the hydraulic pressure generated by the hydraulic booster 20 to cause a pressure difference exceeding the predetermined difference, the hydraulic braking pressure is simply applied to the wheel brake cylinders 51a, 52a through the first and second pressure chambers 81, 82 of the auxiliary cylinder 8 as it is. That is, the hydraulic braking pressure is not increased by the auxiliary cylinder 8.

Figure 2:
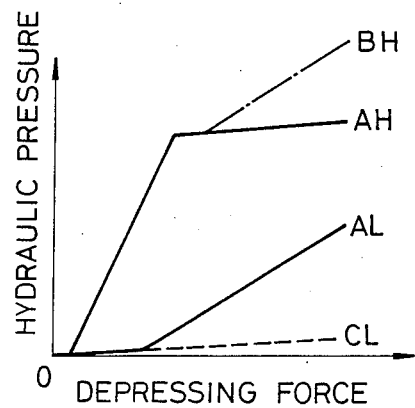
FIG. 2 is a diagram showing a relationship between a depressing force of a brake pedal and a hydraulic braking pressure from a wheel brake cylinder.

FIG. 2 shows the hydraulic braking pressure applied to the wheel brake cylinders 51a, 52a varies in response to the depressing force of the brake pedal 2. The abscissa is represented as the depressing force, while the ordinate is represented as the hydraulic braking pressure, and the characteristics according to the present embodiment are shown by the solid lines. In the case where the hydraulic pressure from the hydraulic booster 20 is sufficient for fulfilling the boost function and is less than the predetermined value, the auxiliary cylinder 8 is inoperative, whereas the hydraulic pressure in each of the wheel brake cylinders 51a, 52a is increased by means of the boost function of the hydraulic booster 20. Thus, in the hydraulic braking system provided with the auxiliary cylinder in the prior art, when the hydraulic pressure from the hydraulic booster exceeds the predetermined value and further the depressing force is applied on the brake pedal, the auxiliary cylinder becomes operative and the hydraulic pressure in each of the wheel brake cylinders is increased, as indicated by one-dotted chain line (BH) in FIG. 2. On the contrary, in the present embodiment, the hydraulic pressure from the hydraulic booster 20 is prevented from being applied to the auxiliary cylinder 8 by the control valve 30 and the hydraulic braking pressure from the master cylinder 10 is applied to each of the wheel brake cylinders 51a, 52a as it is, so that a gentle rise of the hydraulic pressure is obtained, as indicated by a solid line (AH) in FIG. 2. Accordingly, any excessive hydraulic braking pressure is not applied to each of the wheel brake cylinders 51a, 52a.

When the power source 40 or the hydraulic booster 20 does not operate sufficiently and the hydraulic pressure from the hydraulic booster 20 is decreased to cause a pressure difference between the hydraulic pressure from the hydraulic booster 20 and the hydraulic braking pressure from the master cylinder to exceed a predetermined difference, the auxiliary cylinder 8 becomes operative and the hydraulic braking pressure from the master cylinder 10 is increased in the present embodiment, as indicated by a solid line (AL) in FIG. 2. On the contrary, the characteristic of the hydraulic braking pressure in the prior art system provided with no auxiliary cylinder in the above-described condition is shown by a broken line (CL) in FIG. 2.

Figure 3:
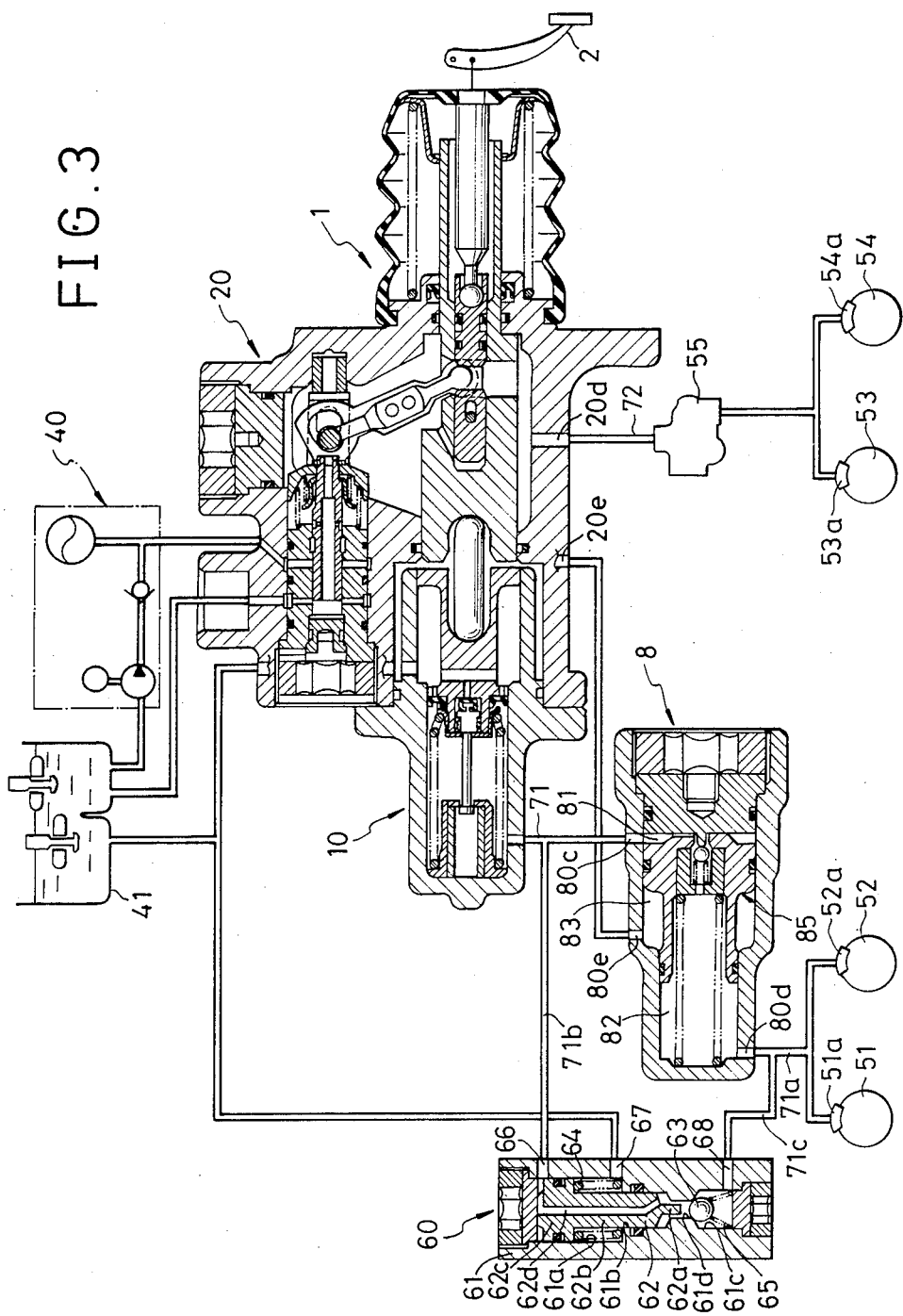
FIG. 3 is a schematic illustration of a hydraulic braking system of a second embodiment of the present invention with a sectional view of a hydraulic pressure generator, an auxiliary cylinder and a bypass valve.

FIG. 3 shows another embodiment of the present invention, which is provided with a different embodiment of the control means from that of the embodiment shown in FIG. 1 and in which the hydraulic power pressure from the power source 40 is used as a pilot pressure to be introduced into the third pressure chamber 83 of the auxiliary cylinder 8. The rest of the elements embodying the present embodiment is substantially same as those of the previous embodiment shown in FIG. 1, so that like reference numerals denote like elements shown in FIG. 1. In the present embodiment, the port 80e of the auxiliary cylinder 8 communicates through the hydraulic circuit 73 with a port 20e which is provided in the hydraulic booster 20 and communicates with the power source 40. The auxiliary cylinder 8 operates in response to a pressure difference between the hydraulic power pressure applied to the third pressure chamber 83 and the hydraulic braking pressure applied to the first pressure chamber 81, and when the hydraulic power pressure becomes less than the hydraulic braking pressure by a predetermined pressure difference or above, the piston 85 slides to increase the hydraulic braking pressure. Since the remaining structure and operation of the auxiliary cylinder 8 are similar to those of the embodiment in FIG. 1, the detailed description thereof will be omitted.

As for the control means according to the present invention, there are provided bypass hydraulic circuits 71b, 71c which connect the hydraulic circuit 71 to the hydraulic circuit 71a to form a bypass circuit for bypassing the auxiliary cylinder 8, and also provided a bypass valve 60 which is disposed between the bypass hydraulic circuits 71b and 71c. The bypass valve 60 is formed of a normally closed valve which is held to be closed when the hydraulic braking pressure from the master cylinder 10 is less than a predetermined value but opens when the above hydraulic braking pressure exceeds the predetermined value.

The bypass valve 60 has a cylinder 61 or a housing, in which there are formed a stepped bore of a large-diameter bore 61a and a small-diameter bore 61b, and a bore 61c is formed as well. The bore 61c communicates with the small-diameter bore 61b through a communication hole 61d. Open ends of the large-diameter bore 61a and the bore 61c are plugged by closure members to form a control chamber and a valve chamber respectively. A small-diameter portion 62b of a stepped cylindrical control piston 62 (hereinafter simply referred to as a piston 62) is fluid-tightly and slidably fitted into the small-diameter bore 61b. On one end of the piston 62, there is formed a projection 62a which is smaller in diameter and larger in length than the communication hole 61d, and which advances and retreats within the communication hole 61d in response to the sliding motion of the piston 62. A large-diameter head portion 62c of the piston 62 is fluid-tightly and slidably fitted into the large-diameter bore 61a. Therefore, the large-diameter bore 61a is divided into a first and a second control chamber by the head portion 62c, the first control chamber communicating with a port 66 while the second control chamber communicating with a port 67. A communication hole 62d for communicating those two control chambers with each other is formed axially in the piston 62. The head portion 62c of the piston 62 is biased by a spring 64 received in the large-diameter bore 61a in the direction away from the communication hole 61d. A valve member 63 is received in the bore 61c and biased by a spring 65 toward the communication hole 61d, so that the communication hole 61d is normally closed, as shown in FIG. 3. A port 68 communicating with the bore 61c is connected to the wheel brake cylinders 51a, 52a by the bypass hydraulic circuit 71c, the port 66 is connected to the master cylinder 10 by the bypass hydraulic circuit 71b and the hydraulic circuit 71, and the port 67 is connected to the reservoir 41.

Accordingly, when the bypass valve 60 is in the state as shown in FIG. 3 and the hydraulic braking pressure from the master cylinder 10 is supplied to the port 66 through the hydraulic circuit 71 and the bypass hydraulic circuit 71b, the communication hole 61d is held to be closed by the valve member 63 with the piston 62 forced away from the valve member 63, if the hydraulic braking pressure from the master cylinder 10 is less than the predetermined value. Thus, the auxiliary cylinder 8 is held to be in its operative condition and increases the hydraulic braking pressure applied to the wheel brake cylinders 51a, 52a in response to a difference in pressure between the first pressure chamber 81 and the third pressure chamber 83.

When the hydraulic braking pressure from the master cylinder 10 exceeds the predetermined value, the piston 62 slides against the spring 64 toward the communication hole 61d. Then, the projection 62a comes into contact with the valve member 63 and further pushes the valve member 63 away from the communication hole 61d to open the communication hole 61d. Thereby, the bypass hydraulic circuit 71b communicates with the bypass hydraulic circuit 71c, and the hydraulic braking pressure from the master cylinder 10 is applied to the wheel brake cylinders 51a, 52a through these bypass hydraulic circuits 71b, 71c. Namely, since the auxiliary cylinder 8 is bypassed and then rendered to be inoperative, the hydraulic braking pressure is not increased. While the third pressure chamber 83 of the auxiliary cylinder 8 communicates with the power source 40 in the present embodiment, it may communicate with the hydraulic booster 20 as in the embodiment of FIG. 1.

Figure 4:
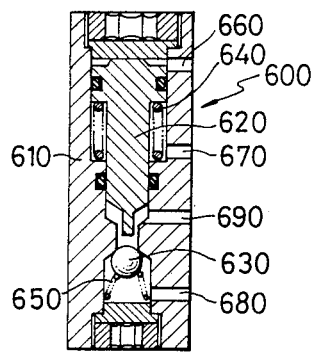
FIG. 4 is a sectional view of a bypass valve showing another embodiment of the hydraulic braking system shown in FIG. 3.

FIG. 4 shows another embodiment of the bypass valve in the embodiment shown in FIG. 3. A bypass valve 600 is formed of a normally closed valve which is held to be closed when the hydraulic pressure supplied from the power source 40 o the hydraulic booster 20 is less than a predetermined value and which allows the communication between the bypass hydraulic circuits 71b, 71c when the above hydraulic pressure exceeds the predetermined value. The bypass valve 600 is similar in structure to the bypass valve 60 shown in FIG. 3, except in that a piston 620 is solid and a port 690 is additionally provided. The remaining structure of the bypass valve 600 is substantially identical with that of the bypass valve 60 and the structural elements of the bypass valve 600 in FIG. 4 equivalent to those described in FIG. 3 will be designated by adding zero (0) to the end of the corresponding reference numerals of the elements in FIG. 3, so that detailed description thereof will be omitted. The bypass valve 600 is substituted for the bypass valve 60 in FIG. 3, and includes a port 660 communicating with the power source 40 or the hydraulic booster 20, a port 670 communicating with the reservoir 41, a port 690 communicating with the master cylinder 10 through the hydraulic circuit 71b and a port 680 communicating with the wheel brake cylinder 51a through the hydraulic circuit 71c. Thus, when the hydraulic pressure from the power source 40 or the hydraulic booster 20 becomes less than the predetermined value, the communication hole is closed by a valve member 630, while the communication hole is rendered to open when the above hydraulic pressure exceeds the predetermined value, so that a bypass circuit is formed with respect to the auxiliary cylinder 8 by the bypass hydraulic circuits 71b, 71c.

Figure 5:
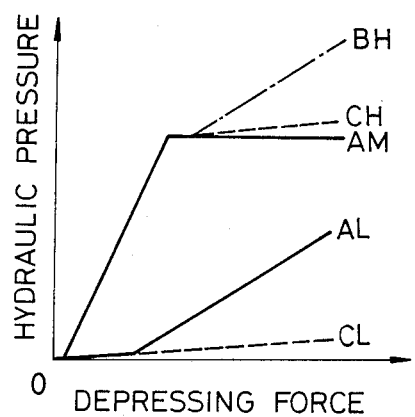
FIG. 5 is a diagram showing a relationship between a depressing force of a brake pedal and a hydraulic braking pressure from a wheel brake cylinder in the embodiments shown in FIGS. 3 and 4.

According to the embodiments shown in FIGS. 3 and 4, obtained are characteristics of the depressing force on the brake pedal the hydraulic braking pressure in the wheel brake cylinder as indicated by solid lines in FIG. 5 which is illustrated in the same manner as FIG. 2. When the hydraulic pressure from the hydraulic booster 20 exceeds the predetermined value, the auxiliary cylinder 8 is bypassed in the present embodiment, and the hydraulic braking pressure from the master cylinder 10 is applied to the wheel brake cylinders 51a, 52a through the bypass hydraulic circuits 71b, 71c. Consequently, the rate of rise of the hydraulic braking pressure in the wheel brake cylinder is more gentle than that in the prior art system provided with no auxiliary cylinder as indicated by a broken line (CH) in FIG. 5, and the hydraulic braking pressure in the wheel brake cylinder may be maintained substantially constant as indicated by a solid line (AM) in FIG. 5 for balancing the hydraulic pressure at the time of bypassing.

Figure 6:
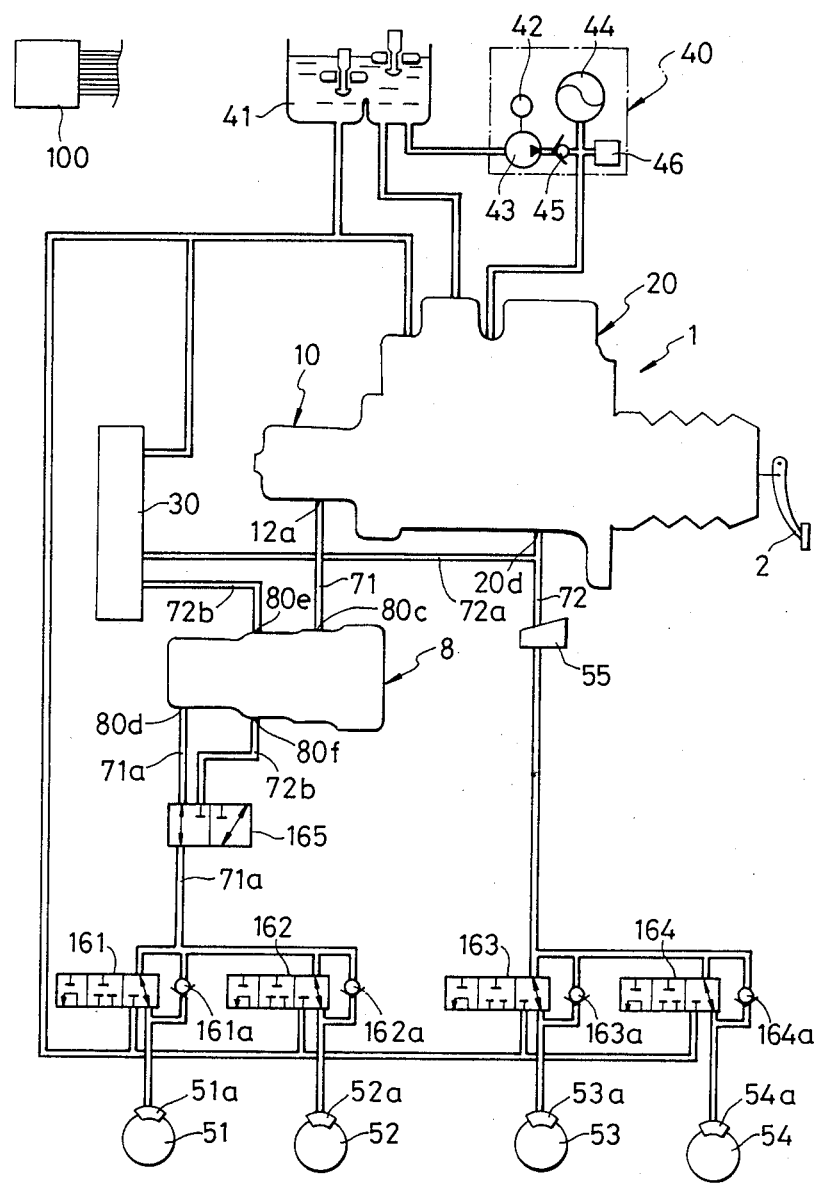
FIG. 6 is a schematic illustration of a hydraulic braking system of a third embodiment of the present invention.

FIG. 6 shows a further embodiment of the present invention, in which the anti-locking system is installed in the hydraulic braking system shown in FIG. 1, and in which like reference numerals denote like elements shown in FIG. 1 and the description thereof will be omitted. The port 12a communicating with the master cylinder 10 is connected to a changeover valve 165, which is a three ports-two positions solenoid operated valve, through the auxiliary cylinder 8 disposed between the hydraulic circuits 71 and 71a. The changeover valve 165 is connected to the wheel brake cylinders 51a, 52a of the front road wheels 51, 52 through control valves 161, 162 and check valves 161a, 162a disposed in parallel with those control valves. A port 80f communicating with the third pressure chamber 83 is provided in the auxiliary cylinder 8 and is connected to the changeover valve 165 by the hydraulic circuit 72b.

In the case where the hydraulic circuit 71 communicates with the hydraulic circuit 71a through the auxiliary cylinder 8, the control valves 161, 162 communicate with the port 12a when the changeover valve 165 is not energized, or inoperative, while the control valves 161, 162 communicate with the port 80f when the changeover valve 165 is energized, or operative, so that the control valves 161, 162 communicate with the port 20d of the hydraulic booster 20 when the hydraulic circuits 72a, 72b communicate with each other through the control valve 30. Accordingly, the changeover valve 165 functions as a normally closed valve with respect to a hydraulic circuit for communicating the third pressure chamber 83 of the auxiliary cylinder 8 with the wheel brake cylinders 51a, 52a.

Each of the control valves 161, 162 is a three ports-three positions solenoid operated valve and is so arranged that each of the wheel brake cylinders 51a, 52a communicates with the changeover valve 165 in a first operating position, the communication therebetween is blocked in a second operating position, and each of the wheel brake cylinders 51a, 52a communicates with the reservoir 41 in a third operating position. Accordingly, the normal braking operation is ordinarily carried out in the first operating position and the first through third operating position are selectively positioned at the time of the anti-locking operation to regulate the hydraulic braking pressure.

As for the rear road wheels 53, 54, the wheel brake cylinders 53a, 54a are similarly connected to control valves 163, 164 and check valves 163a, 164a disposed in parallel therewith, and the control valves 163, 164 are connected to the port 20d of the hydraulic booster 20 through the hydraulic circuit 72 via the proportioning valve 55. The changeover valve 165 is electrically controlled by a controller 100. The control valves 161 to 164 are also controlled by the controller 100 at the time of the anti-locking operation. Further, the hydraulic power pressure from the power source 40 is detected by a sensor 46 provided in an output section of the power source 40 so that the power source 40 is controlled by the controller 100 depending upon the detected hydraulic power pressure.

In operation of the above embodiment, when the changeover valve 165 and the control valves 161 to 164 are positioned as shown in FIG. 6 in the normal braking operation, the front road wheels 51, 52 are braked by the hydraulic braking pressure from the master cylinder 10 and the rear road wheels 53, 54 are braked by the hydraulic pressure from the hydraulic booster 20. When an excessive amount of slip of the road wheels is detected in the braking operation and then the anti-locking operation is initiated, the changeover valve 165 is operated by the controller 100, and the hydraulic pressure generated by the hydraulic booster 20 is supplied from the port 20d to the control valves 161 to 164. Then, the three operating positions in each of the control valves 161 to 164 are selectively positioned depending upon the locking condition of the front and rear road wheels 51 to 54 to regulate the hydraulic braking pressure in each of the wheel brake cylinders 51a to 54a. When the sensor 46 detects that the hydraulic pressure from the power source 40 is insufficient, the changeover valve 165 is rendered to be inoperative by the controller 100 to return to the position shown in FIG. 6, and the hydraulic braking pressure from the master cylinder 10 is increased by the auxiliary cylinder 8 in braking operation. The auxiliary cylinder 8 and the control valve 30 are substantially same in operation as those in the embodiment of FIG. 1.

Accordingly, all the parts necessary for the anti-locking operation may be easily added to the hydraulic braking system shown in FIG. 1. Further, in this embodiment, the changeover valve 165 is provided for use of the antilocking operation, while it functions as a normally closed valve with respect to the hydraulic circuit for communicating the port 20d of the hydraulic booster 20 with the wheel brake cylinders 51a, 52a through the auxiliary cylinder 8 as described above. In consequence, it is possible to extract air out of the brake fluid, which is filled in the boost chamber 20a of the hydraulic booster 20, the third pressure chamber 83 of the auxiliary cylinder 8 and others, by properly operating the changeover valve 165. Thus, the air may be extracted out of the brake fluid at a position away from the pressure generator 1, where it is easy to handle the related parts.

In the above embodiments, the control valve 30, the bypass valve 60 and the bypass valve 600 are only examples, and a fluid control valve of a different type or a solenoid valve may be used. For instance, the bypass valve 60 is formed of a normally closed valve disposed between the hydraulic circuits 71b and 71c, while it may be formed of a changeover valve provided at a junction connecting the hydraulic circuits 71 and 71b. Also, the control valve 30 and the auxiliary cylinder 8 may be easily formed as one body as described above, and the bypass valve 60 or 600 may be formed to be integral with the auxiliary cylinder 8. Further, the proportioning valve 55 may be disposed in the hydraulic circuit 71, with the front road wheels 51, 52 and rear road wheels 53, 54 arranged in inverse relation to their arrangement in the above embodiments.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A hydraulic braking system for an automotive vehicle comprising:
   a power source for generating a hydraulic power pressure;
   a reservoir for storing an amount of brake fluid;
   a master cylinder for introducing said brake fluid thereinto from said reservoir and generating a hydraulic braking pressure in response to operation of a manually-operated member;
   a hydraulic booster for actuating said master cylinder by said hydraulic power pressure supplied from said power source in response to operation of said manually-operated member;
   a plurality of wheel brake cylinders for braking respective road wheels, said wheel brake cylinders being divided into a first group of wheel brake cylinders communicating with said master cylinder through a first hydraulic circuit and a second group of wheel brake cylinders communicating with said hydraulic booster through a second hydraulic circuit;
   an auxiliary cylinder disposed in said first hydraulic circuit for applying said hydraulic braking pressure from said master cylinder directly to said first group of wheel brake cylinders in an inoperative condition of said auxiliary cylinder and increasing said hydraulic braking pressure applied to said first group of wheel brake cylinders in response to operation of said manually-operated member in an operative condition of said auxiliary cylinder, said operative condition being made when one of said hydraulic power pressure generated by said power source and a hydraulic pressure generated by said hydraulic booster is less than said hydraulic braking pressure by a predetermined difference; and
   control means connected to said auxiliary cylinder for allowing said auxiliary cylinder in said operative condition thereof only when one of hydraulic pressures generated by said power source, said hydraulic booster and said master cylinder is less than a predetermined value.

2. A hydraulic braking system for an automotive vehicle as set forth in claim 1, wherein said auxiliary cylinder comprises a cylinder body having a cylinder bore defined therein and a piston axially slidably disposed within said cylinder bore, said piston forming at one end thereof within said cylinder bore a first chamber communicating with said master cylinder, and forming at the other end thereof within said cylinder bore a second chamber communicating with said first group of wheel brake cylinders and a third chamber communicating with one of said power source and said hydraulic booster, said piston having a valve mechanism disposed therein for normally allowing the communication between said first chamber and said second chamber, and blocking the communication therebetween when a hydraulic pressure in said third chamber is less than a hydraulic pressure in said first chamber by said predetermined difference.

3. A hydraulic braking system for an automotive vehicle as set forth in claim 2, wherein said cylinder body of said auxiliary cylinder is formed therein with a stepped cylinder bore of a large-diameter bore with a closure member plugged thereinto and a small-diameter bore with a closed end, and wherein said piston has a stepped head portion slidably fitted into said large-diameter bore, and a cylindrical skirt portion extending from said stepped head portion and slidably fitted into said small-diameter bore, said first chamber being formed within said large-diameter bore between said closure member and said stepped head portion, said second chamber being formed within said small-diameter bore between said closed end thereof an said skirt portion, and said third chamber being formed within said large-diameter bore between said stepped head portion and said skirt portion.

4. A hydraulic braking system for an automotive vehicle as set forth in claim 2, wherein said control means comprises a control valve disposed in a third hydraulic circuit communicating said third chamber with one of said power source and said hydraulic booster, said control valve permitting the fluid communication through said third hydraulic circuit when one of hydraulic pressures supplied therethrough from said power source and said hydraulic booster is less than said predetermined value, and blocking the fluid communication through said third hydraulic circuit when one of said hydraulic pressures supplied therethrough exceeds said predetermined value.

5. A hydraulic braking system for an automotive vehicle as set forth in claim 4, wherein said control valve is formed integrally with said auxiliary cylinder.

6. A hydraulic braking system for an automotive vehicle as set forth in claim 4, wherein said control valve comprises:
 a housing defining therein a control chamber and a valve chamber communicating with said control chamber through a communication hole;
 a spherical valve member accommodated in said valve chamber seated on a seat around said communication hole;
 a control piston slidably received in said control chamber and provided with a projection at one end thereof extending through said communication hole for abutting contact with said spherical valve member, said control piston dividing said control chamber into a first control chamber and a second control chamber communicating with said valve chamber;
 a first spring accommodated in said first control chamber for biasing said control piston toward said spherical valve member; and
 a second spring accommodated in said valve chamber for biasing said spherical valve member toward said control piston, said first control chamber communicating with said reservoir, said second control chamber communicating with said hydraulic booster and said valve chamber communicating with said third chamber of said auxiliary cylinder.

7. A hydraulic braking system for an automotive vehicle as set forth in claim 2 further comprising a changeover valve selectively placed in one of a first operating position for communicating said first group of wheel brake cylinders with said second chamber of said auxiliary cylinder, and a second operating position for communicating said first group of wheel brake cylinders with said third chamber of said auxiliary cylinder and blocking the communication between said first group of wheel brake cylinders and said second chamber of said auxiliary cylinder.

8. A hydraulic braking system for an automotive vehicle as set forth in claim 7 further comprising a first pair of valve means for controlling the communication between said changeover valve and each of said first group of wheel brake cylinders respectively, and the communication between said reservoir and each of said first group of wheel brake cylinders respectively, and a second pair of valve means for controlling the communication between said hydraulic booster and each of said second group of wheel brake cylinders respectively, and the communication between said reservoir and each of said second group of wheel brake cylinders respectively.

9. A hydraulic braking system for an automotive vehicle as set forth in claim 8 wherein said control means comprises a control valve disposed in a third hydraulic circuit communicating said third chamber with one of said power source and said hydraulic booster, said control valve permitting the fluid communication through said third hydraulic circuit when one of hydraulic pressures supplied therethrough from said power source and said hydraulic booster is less than said predetermined value, and blocking the fluid communication through said third hydraulic circuit when one of said hydraulic pressures supplied therethrough exceeds said predetermined value.

10. A hydraulic braking system for an automotive vehicle as set forth in claim 1, wherein said control means comprises a bypass circuit communicating said master cylinder with said first group of wheel brake cylinders in parallel with said first hydraulic circuit, and a bypass valve disposed in said bypass circuit for normally blocking the fluid communication through said bypass circuit and permitting the fluid communication through said bypass circuit when one of hydraulic pressures supplied from said power source, said hydraulic booster and said master cylinder exceeds said predetermined value.

11. A hydraulic braking system for an automotive vehicle as set forth in claim 10, wherein said bypass valve comprises:
 a housing defining therein a stepped cylinder bore of a large-diameter bore and a small-diameter bore, and defining a valve chamber communicating with said small diameter bore through a communication hole;
 a spherical valve member accommodated in said valve chamber seated on a seat around said communication hole;
 a control piston having a head portion slidably received in said large-diameter bore and defining within said large-diameter bore a first control chamber and a second control chamber divided by said head portion, and having a body portion slidably received in said small-diameter bore and forming therein a third control chamber communicating with said valve chamber through said communication hole, said control piston being provided with a projection at one end thereof extending through said communication hole for abutting contact with said spherical valve member;

a first spring accommodated in said stepped cylinder bore for biasing said control piston away from said spherical valve member; and a second spring accommodated in said valve chamber for biasing said spherical valve member toward said control piston, said first control chamber communicating with one of said power source, said hydraulic booster and said master cylinder, said second control chamber communicating with said reservoir, said third control chamber communicating with said master cylinder, and said valve chamber communicating with said first group of wheel brake cylinders.

12. A hydraulic braking system for an automotive vehicle as set forth in claim 10 wherein said bypass valve comprises a solenoid-operated changeover valve disposed in said bypass circuit 13. A hydraulic braking system for an automotive vehicle as set forth in claim 10, wherein said bypass valve is formed integrally with said auxiliary cylinder.

* * * * *